United States Patent
Hong et al.

(10) Patent No.: US 7,703,926 B2
(45) Date of Patent: Apr. 27, 2010

(54) PROJECTOR CAPABLE OF CAPTURING IMAGES AND BRIEFING SYSTEM HAVING THE SAME

(75) Inventors: Hei-Tai Hong, Hsinchu (TW); Yueh-Hong Shih, Hsinchu (TW)

(73) Assignee: Everest Display Inc., Hsinchu (TW)

( * ) Notice: Subject to any disclaimer, the term of this patent is extended or adjusted under 35 U.S.C. 154(b) by 787 days.

(21) Appl. No.: 11/527,516

(22) Filed: Sep. 27, 2006

(65) Prior Publication Data

US 2007/0273838 A1 Nov. 29, 2007

(30) Foreign Application Priority Data

May 25, 2006 (TW) ............... 95209009 U

(51) Int. Cl.
*G03B 21/00* (2006.01)
(52) U.S. Cl. ............... 353/42; 353/21; 353/30; 353/69; 345/156; 348/14.05
(58) Field of Classification Search ............ 353/42, 353/30, 21, 69; 348/14.05, 207.1; 345/156
See application file for complete search history.

(56) References Cited

U.S. PATENT DOCUMENTS

| 2003/0002016 A1* | 1/2003 | Sellen et al. ............... 353/31 |
| 2004/0095312 A1* | 5/2004 | Chen ............... 345/156 |
| 2006/0033884 A1* | 2/2006 | Sato ............... 353/30 |

* cited by examiner

*Primary Examiner*—Georgia Y Epps
*Assistant Examiner*—Sultan Chowdhury
(74) *Attorney, Agent, or Firm*—Rosenberg, Klein & Lee

(57) ABSTRACT

A briefing system is used to project images onto a projection screen to form a projection picture. The briefing system comprises a pointer, a projector and a computer electrically connected to the projector. The computer outputs an image signal to the projector. The projector projects an image corresponding to the image signal onto the projection screen to form the projection picture. The indicator is used to project an indication point. The projector also captures the image of the projection picture and the indication point and transfers the image to the computer. The computer then calculates a location where the cursor on the computer screen should reach according to the location of the indication point on the projection picture and moves the cursor on the screen to there.

7 Claims, 3 Drawing Sheets

PROJECTOR CAPABLE OF CAPTURING IMAGES AND BRIEFING SYSTEM HAVING THE SAME

BACKGROUND OF THE INVENTION

1. Field of the Invention

The present invention relates to a projector and, more particularly, to a projector capable of capturing images.

2. Description of Related Art

Because of the popularity of notebook computers and briefing software, many people edit and store briefing data in a notebook computer using briefing software, and show the briefing data on the screen of the notebook computer using the briefing software and also project the briefing data onto a projection screen via a projector, thereby vividly presenting the briefing data in front of the audience to enhance the briefing quality.

During the briefing process, the briefer usually utilizes a pointer capable of projecting a red indication point on the projection screen to indicate important parts to make the audience more understand the content and progress of the briefing. For example, he can move the red indication point around an important part. However, the motion locus of the red indication point is always instantaneous and cannot be continually display on the projection screen. Therefore, the audience cannot clearly view the selected important contents.

Moreover, the briefer also needs to operate a notebook computer to control the progress of the briefing, e.g., moving the mouse to turn page, clicking a multimedia to be played, opening a file, and so on. However, it usually bothers the briefer when giving consideration to both the operations of a notebook computer and a laser pointer.

If two persons separately operate a notebook computer and a laser pointer, the briefer usually has to communicate the progress of the briefing data with the other person during briefing, hence making the briefing process more unsmooth.

In order to enhance the briefing quality, a conventional briefing system allows the briefer to control the action of the notebook computer via the laser pointer when operating the laser pointer, and allows the selected or marked key points of the briefing to be continually displayed on the projection screen.

As shown in FIG. 1, the above briefing system comprises a projector 81, a laser pointer 82, a computer 83 and an image capturing unit 84. The projector 81 is electrically connected to the computer 83, and projects the image on a screen (not shown) of the computer 83 onto a projection screen 9 to produce a projection picture (not shown). The laser pointer 82 can project a red indication point (not shown) onto the projection picture. The image capturing unit 84 is electrically connected to the computer 83, and constantly captures an image including the red indication point and the projection picture and outputs the image to the computer 83. The image capturing unit 84 usually contains a camera lens made of charge coupled device (CCD).

The computer 83 transforms the location of the indication point on the projection picture to a location where a cursor (not shown) on the computer screen corresponding to the indication point should reach and moves the cursor to there. The computer 83 also transforms the motion locus of the indication point on the projection picture of two adjacent pictures to the motion locus of the cursor on the computer screen and shows the motion locus on the computer screen. Because the projector 81 projects the screen image of the computer 83, the audience can clearly view the marked key points on the projected picture.

Because the image capturing unit 84 is connected to the computer 83 and has no fixed and definite location relation with the projector 81, the briefer has to first adjust the location of the image capturing unit 84 to allow the image capturing unit 84 to be able to capture an image simultaneously containing the projection picture and the indication point each time when he uses the briefing system. When the briefing site is changed or either one of the projector 81 and the image capturing unit 84 is carelessly touched to move, the briefer has to adjust the location of the image capturing unit 84 again, hence causing much trouble and inconvenience in use.

In order to let the computer 83 be able to accurately calculate the locus of the red indication point, the location of the image capturing unit 83 cannot be changed after being positioned, thereby making the reference coordinate of two adjacent pictures identical. Sometimes, the location of the image capturing unit 84 that is not fixed may be changed when the briefer operates the computer 83.

Besides, because the image capturing unit 84 is externally connected to the computer 83, the briefer usually has to prepare a power supply to provide electric power for the image capturing unit 84, causing some trouble in portability.

SUMMARY OF THE INVENTION

An object of the present invention is to provide a projector capable of capturing images. The projector integrates the functions of a conventional projector and an image capturing unit. The briefer thus needs not to extra prepare a power supply.

Another object of the present invention is to provide a briefing system capable of displaying key parts of a briefing that is marked by the briefer using a pointer.

The projector capable of capturing images of the present invention is used to project the screen image of a computer electrically connected therewith onto a projection screen to produce a projection picture. The projector comprises a hollow casing, a projection control unit and an image capturing unit.

The projection control unit is fixed disposed in the casing, and receives the screen image of the computer and projects it onto the projection screen to produce the projection picture.

The image capturing unit is fixedly disposed at a location in the casing where it can capture the whole projection picture produced by the projection control unit, and captures an image on the projection screen containing a region covered by the whole projection picture.

The briefing system of the present invention is used to project an image onto a projection screen to produce a projection picture, and comprises the above projector capable of capturing images and a pointer.

The pointer can project an indication point on the projection screen and in the region covered by the projection picture.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 2:
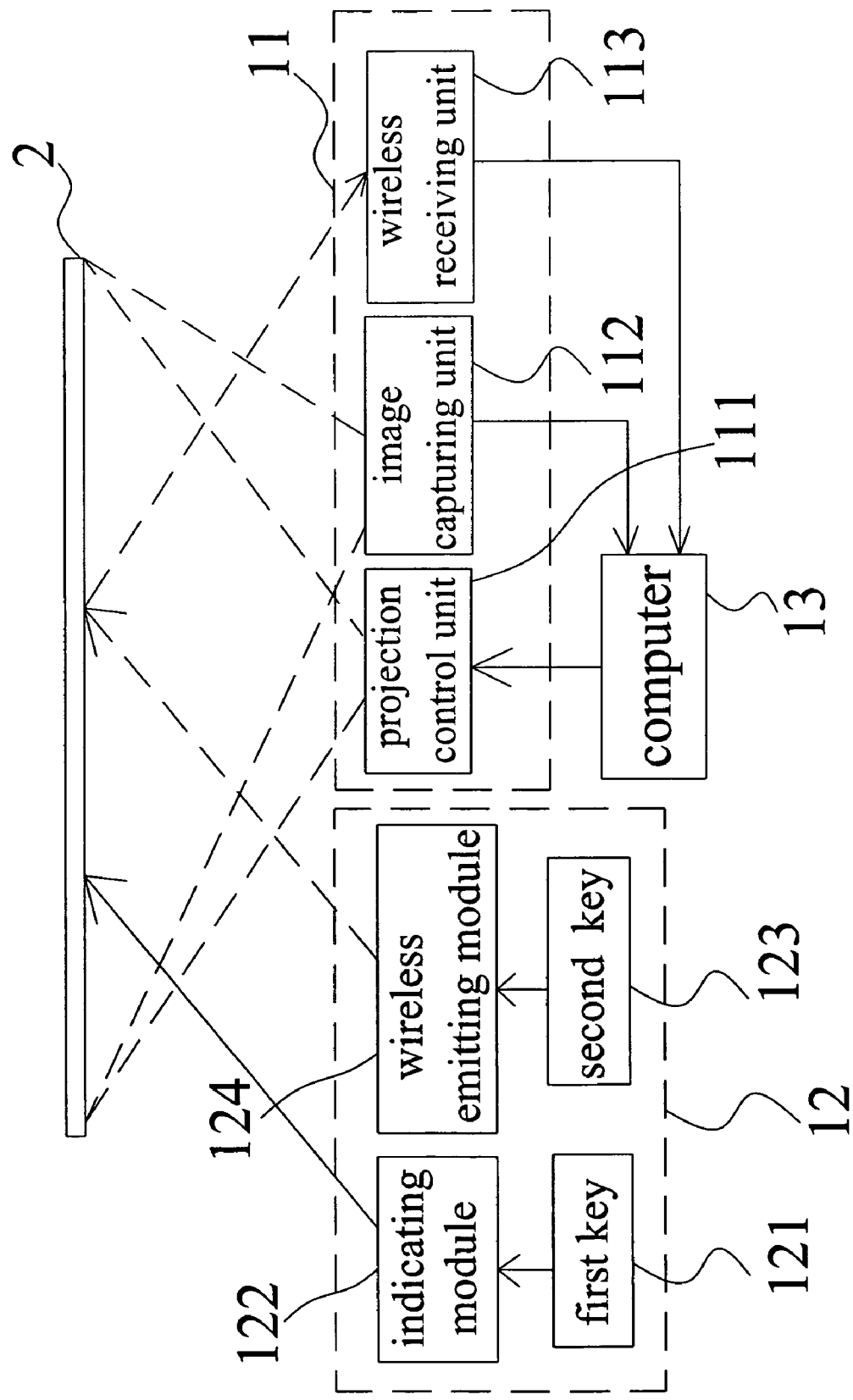
FIG. 2 is a diagram of a briefing system according to an embodiment of the present invention.

As shown in FIG. 2, a briefing system according to a preferred embodiment of the present invention comprises a projector 11, a pointer 12 and a computer 13 electrically connected to the projector 11.

The projector 11 can capture images, and comprises a hollow casing (not shown), a projection control unit 111, an image capturing unit 112 fixedly disposed in the casing and capable of electrically connecting the computer 13, and a wireless receiving unit 113 fixedly disposed in the casing and capable of electrically connecting the computer 13. The projection control unit 111 is fixedly disposed in the casing. A projection exit (not shown) is disposed at a predetermined location of the casing, and a projection exit (not shown) is disposed at a proper location of the casing. The projection control unit 111 has a light source (not shown) and a control circuit (not shown) electrically connected to the light source and the computer 13. The location of the light source in the casing approximately corresponds to the projection exit. The control circuit receives an image signal output by the computer 13, and lets the image signal undergo the projection processing of the light source. A projection picture (not shown) is then projected onto a projection screen 2 from the projection exit of the casing. Because this part of technique is not characteristic of the present invention and is well-known for those skilled in this field, it won't be further described below.

The pointer 12 has a first key 121, an indicating module 122 electrically connected to the first key 121, a second key 123, and a wireless emitting module 124 electrically connected to the second key 123. When the briefer presses the first key 121, the indicating module 122 will produce a visible indication point (not shown) on the projection screen 2.

It should be noted that, in this embodiment, the pointer 12 is a laser pointer. But the pointer 12 can also be a pointer emitting a light source in another way such as infrared. Because the location of the indication point (not shown) on the projection screen where the pointer 12 projects can be immediately displayed by the projection control unit 111, the light source emitted by the pointer 12 is not necessarily limited to visible light. If invisible light such as infrared is adopted, the briefing system of the present invention can also achieve the same indicating effect.

The image capturing unit 112 constantly captures an image on the projection screen 2 including the indication point of the pointer 12 and the projection picture, and sends the image to the computer 13. It should be noted that the image capturing unit 112 can be fixedly disposed outside the casing or partially fixedly in the casing and partially fixed outside the casing. Besides, the casing can have a proper open so that the image capturing unit 112 fixedly disposed in the casing can successfully capture images. In short, it is only necessary for the image capturing unit 112 to be able to capture the whole projection picture produced by the projection control unit 111 at the location on the casing where it is fixedly disposed. The image capturing unit 111 can thus successfully capture an image on the projection screen 2 including the projection screen and the indication point.

In the preferred embodiment of the present invention, the image capturing unit 112 has a camera lens (not shown) made of CCD and arranged above the projection exit. The optical axis of the CCD camera lens is parallel to that of the projection exit. The camera lens of the image capturing unit 112 can also be made of complementary metal oxide semiconductor (CMOS) that can sense images.

It should be noted that if the light source emitted by the pointer 12 is invisible light such as infrared, a filtering plate of specific wavelength can be added in front of the image capturing unit 112 so that the sensor of the camera lens can detect light of specific wavelength to capture the image.

The computer 13 receives an image output by the image capturing unit 112 and analyzes the relative locations of the indication point and the projection picture, and calculates the location where the cursor on the computer screen corresponding to the indication point should reach and moves the cursor to there.

In addition to emitting the indication point, the first key 122 can also have other functions.

The second key 123 of the pointer 12 simulates the function of the left key of a mouse. When the briefer is toward the projection screen 2 and presses the second key 123, the wireless emitting module 124 wirelessly emits a selection signal. In the preferred embodiment of the present invention, the selection signal emitted by the wireless emitting module 124 is of the form of infrared. The selection signal emitted by the wireless emitting module 124 can also be of the form of radio frequency (RF).

Because the emitting direction of the selection signal is essentially parallel to the direction the indicating module 122 emits the indication point, the selection signal is received by the wireless receiving unit 113 after reflected by the projection screen 2. The wireless receiving unit 113 then outputs the selection signal to the computer 13, which sets the file or object pointed by the cursor on the computer screen to a selected state.

When the selection signal emitted by the wireless emitting module 124 is of the form of RF, the selection signal will be emitted in a broadcasting way to be received by the wireless receiving unit 113.

Because the image capturing unit 112 is fixedly disposed on the casing and has a fixed relative location relation with the projection exit, the user needs not to adjust the location of the image capturing unit 112 each time he uses the briefing system. The image capturing unit 112 can simultaneously capture the images of the red indication point and the projection picture.

Besides, because the projection control unit 111 and the image capturing unit 112 are integrated together, only a power supply is required. The briefer needs not to bring another power supply.

Figure 3:
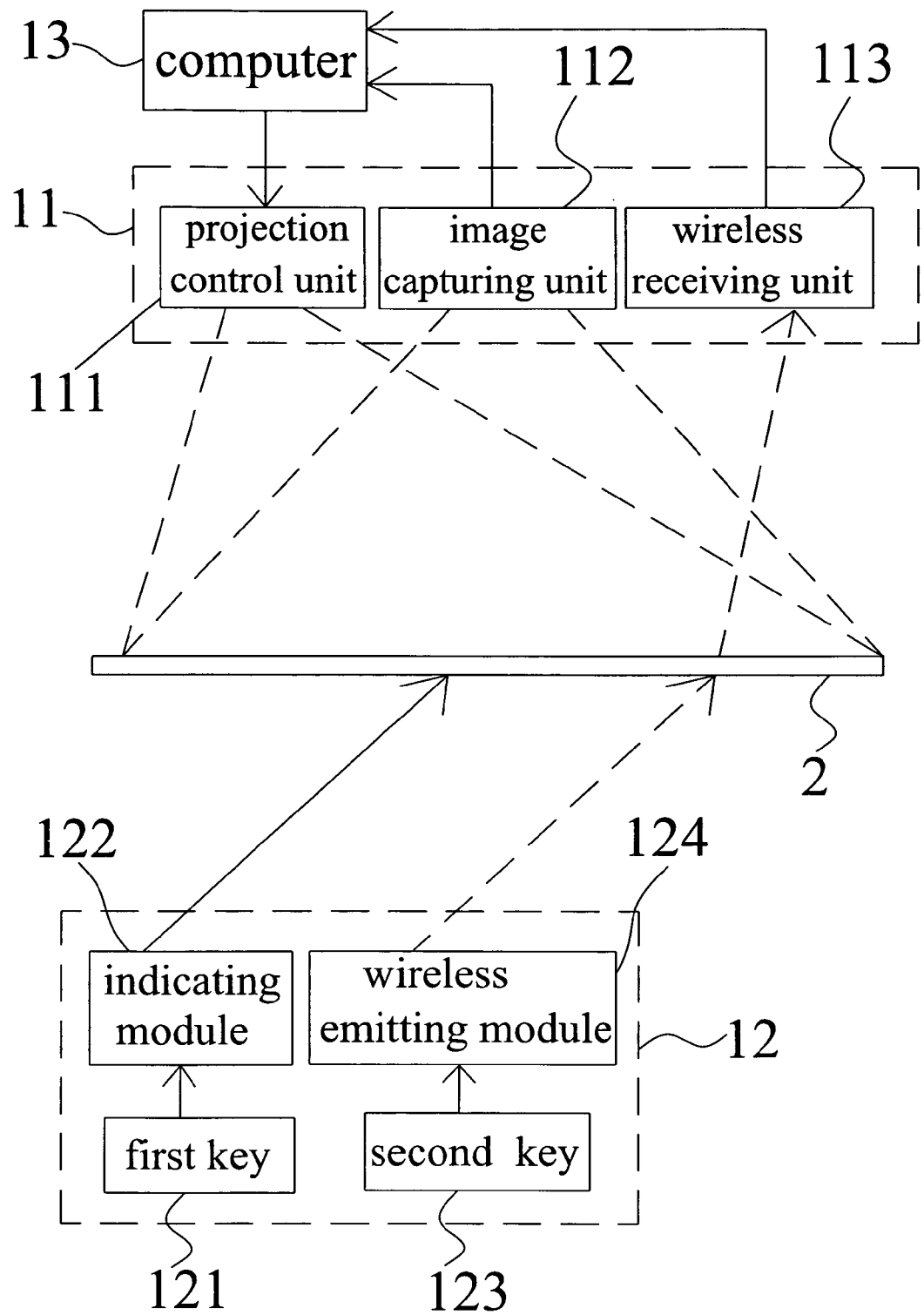
FIG. 3 is a diagram of a briefing system according to another embodiment of the present invention.

As shown in FIG. 3, according to another embodiment of the present invention, the projection control unit 111 can also be a rear projector, which projects a screen image of the computer 13 onto the projection screen 2 and captures a laser point (indication point) projected onto the projection screen 2 for further processing.

It should be noted that the projector 11 of the briefing system of the present invention can also be separately manufactured and sold. The projector 11 can have a projection light source of liquid crystal display (LCD), digital light processing (DLP), liquid crystal on silicon (LCOS) or cathode ray tube (CRT), but is not limited to these. The projector can capture the image of an indication point projected by other conventional pointers to move the cursor on a computer screen.

Figure 1:
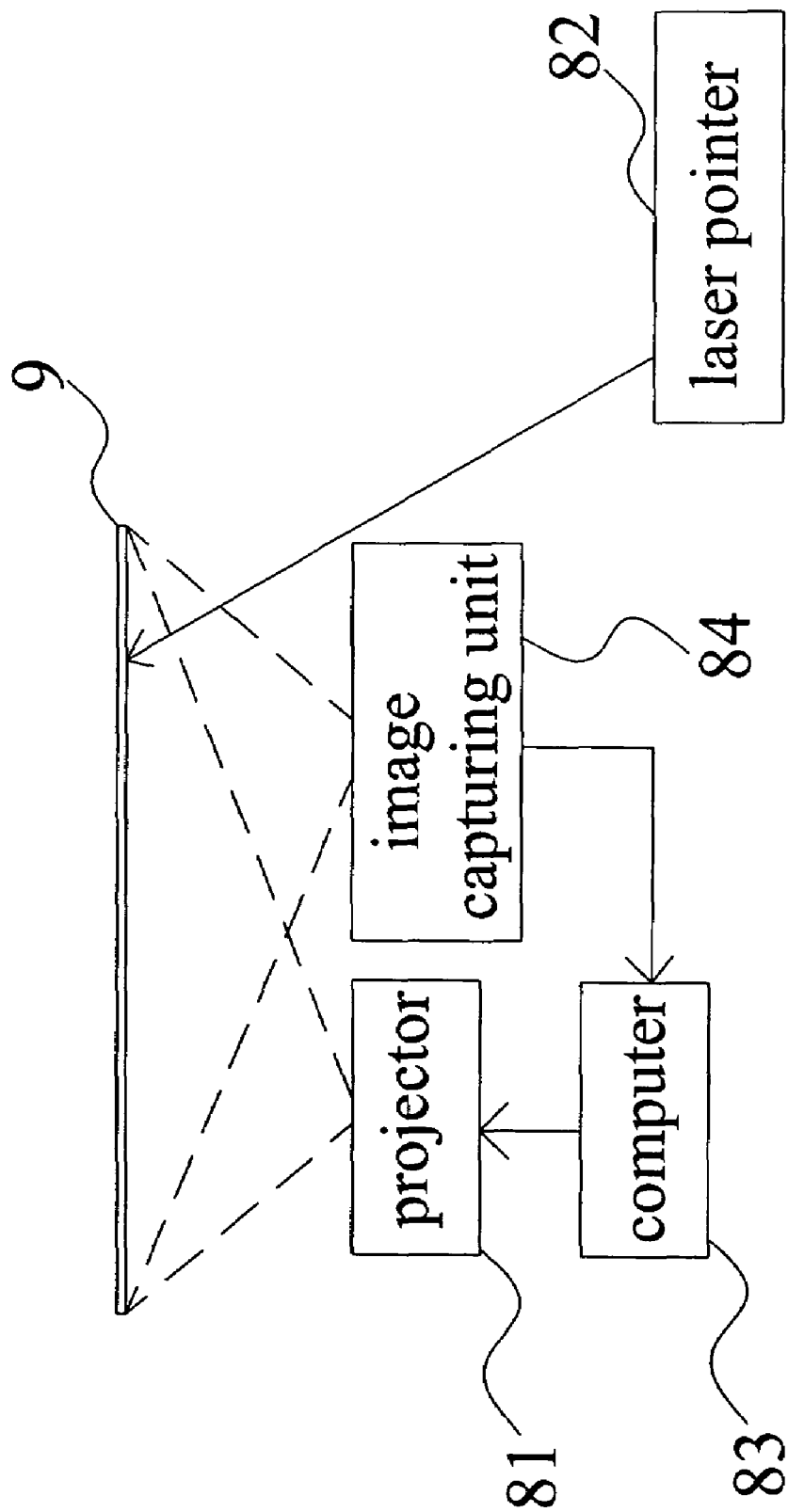
FIG. 1 is a diagram showing the connection relation between a projector, a computer and an image capturing unit in a prior art briefing system.

To sum up, the briefing system of the present invention integrates the functions of the conventional projector 81 and the image capturing unit 84 shown in FIG. 1, and gives a fixed location relation to them. The briefer can save the trouble of adjusting the location of the image capturing unit 112 for simultaneously capturing the images of the indication point of the pointer 12 and the projection picture.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A briefing system used to project an image onto a projection screen to produce a projection picture, said briefing system comprising:
    a pointer capable of projecting an indication point in a region on said projection screen and covered by said projection picture; and
    a projector comprising:
        a hollow casing;
        a projection control unit fixedly disposed in said casing and used to receive a screen image of a computer and project said screen image onto said projection screen to produce said projection picture, said screen image received by said projection control unit is output by said computer and said image captured by said image capturing unit is input to said computer for analysis, said computer calculates a location where the cursor on a computer screen should reach corresponding to said indication point on said projection screen according to relative locations of said indication point and said projection picture in said image received from said image capturing unit, and moves the cursor on the screen to there; and
        an image capturing unit fixedly disposed at a location in said casing where it can capture said whole projection picture produced by said projection control unit and capture an image of said projection screen including said projection picture and said indication point.

2. The briefing system as claimed in claim 1, wherein said pointer has a first key, a second key, a indicating module electrically connected to said first key, and a wireless emitting module electrically connected to said second key, and said projector has a wireless receiving unit, said indicating module generates said indication point when said first key is pressed, said second key simulates the function of a left key of a mouse, said wireless emitting module emits a selection signal when said second key is pressed, and said wireless receiving unit can receive said selection signal and transmits said received selection signal to said computer to let said computer set an object where said screen cursor is located to a selected state.

3. The briefing system as claimed in claim 1, wherein said pointer uses an infrared light source to project an indication point on said projection screen.

4. A briefing system used to project an image onto a projection screen to produce a projection picture, said briefing system comprising:
    an infrared pointer capable of projecting an infrared indication point in a region on said projection screen and covered by said projection picture; and
    a projector comprising:
        a hollow casing;
        a projection control unit fixedly disposed in said casing and used to receive a screen image of a computer and project said screen image onto said projection screen to produce said projection picture; and
        an image capturing unit fixedly disposed at a location in said casing where it can capture said whole projection picture produced by said projection control unit and capture an image of said projection screen including said projection picture and said infrared indication point;
    wherein said computer receives the image output by said image capturing unit and analyzes the relative locations of said infrared indication point and said projection picture to calculate a location where the cursor on a computer screen corresponding to said infrared indication point should reach and move the cursor to there.

5. The briefing system as claimed in claim 4, wherein said pointer has a first key, a second key, a indicating module electrically connected to said first key, and a wireless emitting module electrically connected to said second key, and said projector has a wireless receiving unit, said indicating module generates said indication point when said first key is pressed, said second key simulates the function of a left key of a mouse, said wireless emitting module emits a selection signal when said second key is pressed, and said wireless receiving unit can receive said selection signal and transmits said received selection signal to said computer to let said computer set an object where said screen cursor is located to a selected state.

6. The briefing system as claimed in claim 4, wherein said pointer uses an infrared light source to project an indication point on said projection screen.

7. The briefing system as claimed in claim 4, wherein said image capturing unit detects invisible light of specific wavelength emitted by said infrared pointer and filters visible light.

\* \* \* \* \*